United States Patent Office 2,832,018
Patented Apr. 22, 1958

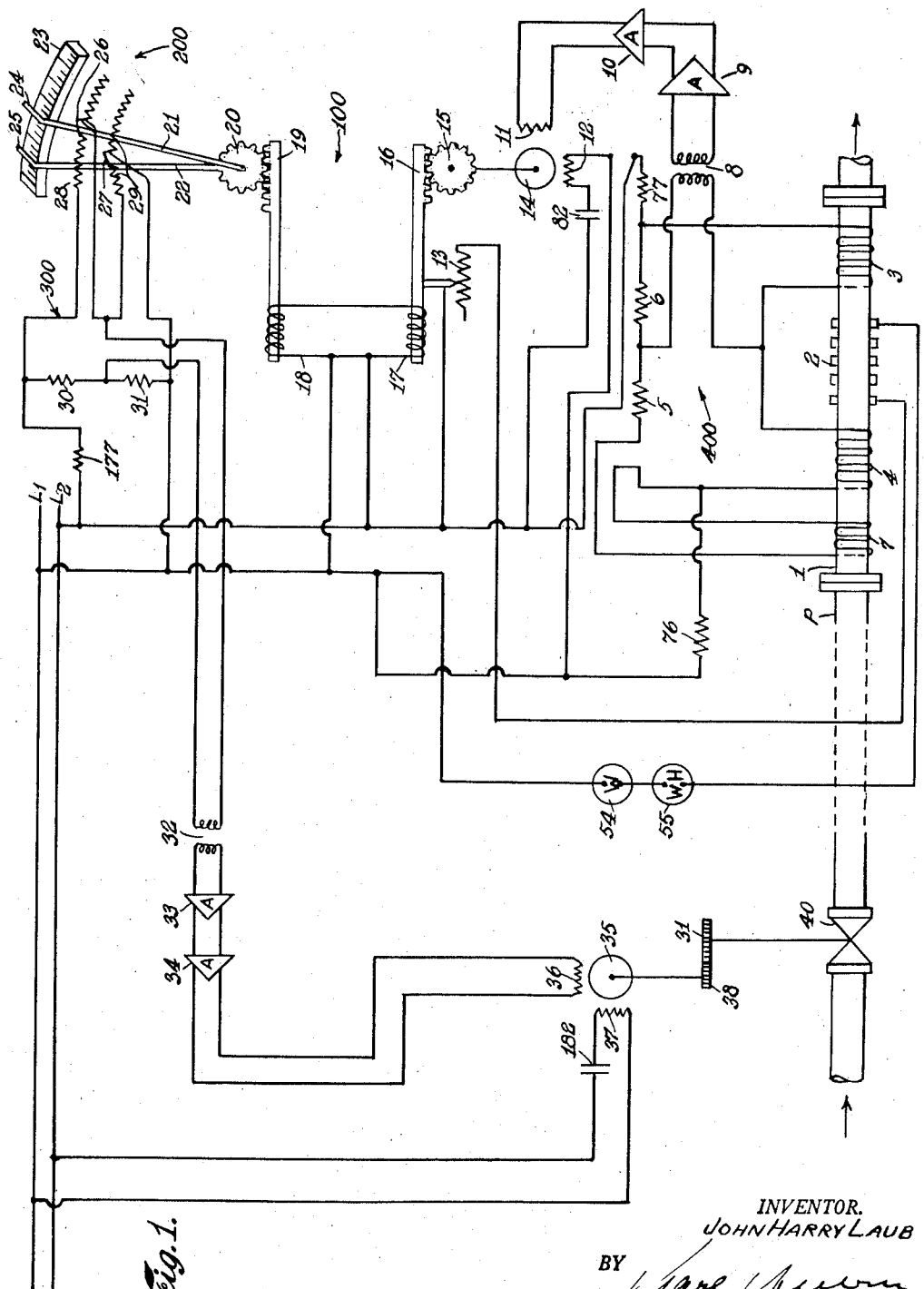

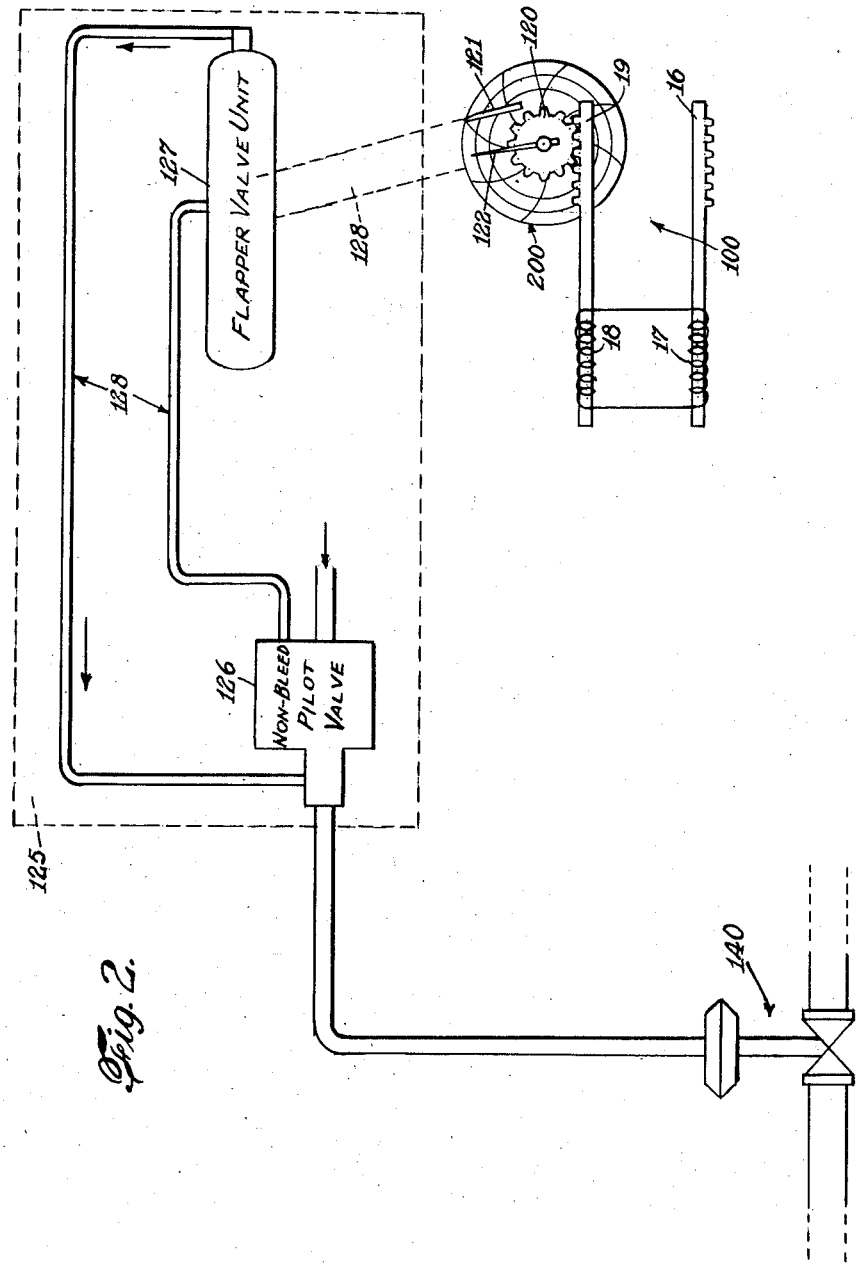

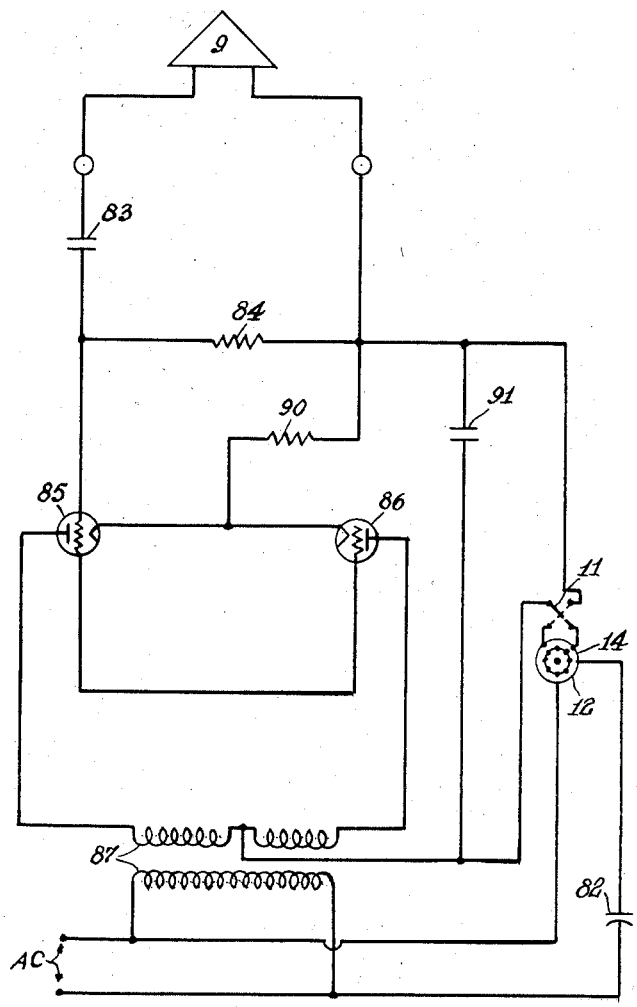

2,832,018
SERVO SYSTEM OR THE LIKE

John H. Laub, Short Hills, N. J.

Application October 25, 1951, Serial No. 253,118

6 Claims. (Cl. 318—29)

This invention relates to a flow meter and is particularly concerned with an automatic flow control system for measuring and controlling the rate of flow or quantity of flow of a liquid or other medium flowing through a conduit.

This application is a continuation-in-part of my prior application Serial No. 671,179, filed on May 21, 1946, now abandoned.

The flow meter disclosed in my aforementioned application is of the electrocaloric or thermal type and has the advantage of allowing free flow with low pressure drop of a flowing medium in a conduit, e. g. corrosive fluids, gasoline, ether, chlorine, etc. while enabling an accurate remote indication of the flow rate with no energy being taken from the fluid. It has the further advantage of requiring small space for its installation and since it is of small weight its use in airplanes has proved highly advantageous.

The aforementioned flow meter is particularly adaptable to use in connection with the regulation of flow in a conduit. It is highly desirous in certain applications to maintain a flow of fluid substantially at a constant value and to immediately adjust the flow to maintain such constant value when fluctuations are present in the flow line.

It is, therefore, one object of my invention to provide apparatus to automatically control the flow of fluid in a conduit. It is another object of my invention to provide a flow meter of the thermal type in connection with the control of the flow of fluids such as corrosive fluids, gasoline, oil and cooling liquids in airplanes and which is accurate within a wide range of temperatures and supply voltages. It is a further object of my invention to apply a thermal flow meter to the flow control of a flowing medium wherein a control valve in the flow conduit is automatically adjusted in accordance with fluctuations in flow.

The nature of the electrical arrangement of this invention and the functioning thereof will become more apparent as will other objects and advantages thereof from the following description and the accompanying drawings, in which:

Fig. 1 represents an electrical arrangement of elements to automatically operate a flow valve inserted in a flow conduit, Fig. 2 represents another arrangement of elements to automatically operate a flow valve inserted in a flow conduit and is a modification of a portion of the circuit of Fig. 1, and Fig. 3 represents a portion of the electrical circuit shown in Figs. 1 and 2.

If heat energy is introduced into or withdrawn from a medium flowing within a conduit and its temperature is measured both before and after the heat exchange the temperature difference $\Delta t$ between the upstream (before the heat exchange) and the downstream (after the heat exchange) thermometer readings will vary with the rate of flow. The differential temperature $\Delta t$ will be small for high flow rates and large for low flow rates.

The flow meter used in the invention therefore involves the provision of a heat exchanger thermally interconnecting a heating or cooling means with the flowing medium. This flow meter may be operated by D. C. current as well as A. C. current and may be utilized to control either the rate of flow or total quantity of flow of a liquid or gaseous medium at any predetermined desired rate of flow.

The flow meter to be used in my invention is shown in Fig. 1 wherein a conduit or pipe P is shown as the means through which the fluid flows. This conduit or pipe line P contains a pipe section 1 of material of high thermal conductivity (e. g. silver, copper, etc.) spaced and heat insulated from the adjacent sections of the pipe P by flange connections and insulating spacers which are formed of material of low thermal conductivity, e. g. rubber, Bakelite, neoprene, ceramic material or the like.

A heater coil 2 and two resistance thermometer coils 3, 4 are mounted on the pipe P directly. Heat is transferred to the flowing medium through coil 2 wound on the outside portion of the section 1 which may be formed of any suitable resistance element e. g. a wire or ribbon of such metals or alloys as nichrome, manganin, constantan, all of which have negligible temperature coefficients of resistance. The resistance thermometers 3, 4 consist of coils of thermo-responsive wire or ribbon wound on the outside of the conduits (e. g. nickel, platinum, alloys of precious metals, etc.). The reference thermometer 4 is wound on section 1 preceding the heater coil in the flow stream to measure the temperature of the fluid prior to the application of heat to the fluid and the thermometer 3 is wound on section 1. All the coils may be protected against ambient temperature effects by being heat insulated and enclosed in a housing which is in intimate thermal contact with the pipe (not shown).

If the wattage input W to the heater 2 is kept constant and the temperature differential $\Delta t$ is measured, the rate of flow M would be inversely proportioned to $\Delta t$ and would have to be read on a meter with a non-uniform, i. e. hyperbolic scale. If, however, the temperature difference $\Delta t$ is kept constant by varying the wattage input W to the heater coil, the rate of flow M is proportional to W and can be read on the linear scale of a wattmeter 54 measuring W.

The latter arrangement is accomplished by connecting the resistance thermometers 3, 4 to a Wheatstone bridge circuit as two arms thereof and two fixed resistances 5, 6 are provided as the ratio arms thereof. A rheostat 13 is provided in series with the heater coil 2 and the power supply $L_1$, $L_2$. The bridge circuit is kept in balance for a given temperature difference $\Delta t$. If the balance is disturbed by a change in the rate of flow M, it is restored by increasing or decreasing the wattage input W to the heater coil.

Totalizing of the flow can be achieved simply by adding to the heated coil circuit a watt hour meter 55 which will then register the total quantity of the fluid passing through section 1. Both the watt meter and watt-hour meter are calibrated to read flow values directly.

The accuracy of flow measurements with the electrocaloric meter described may be affected by changing temperature of the fluid. The wattage W and the flow rate M are approximately proportional as long as the specific heat of the fluid remains constant. The latter is practically constant within a wide range of temperatures for most gases but varies somewhat for most liquids. For aviation gasoline of 0.702 specific gravity, for instance, the specific heat is 0.49 at 0° C. and increases proportionately with temperature to 0.55 at 50° C., i. e. at the rate of approximately ¼ of 1% per ° C.

Furthermore, the viscosity of the fluid is also affected by its temperature. It increases for gases and decreases for liquids with increased temperature, and thus affects, to a certain extent, the character of the flow and the mechanism of the heat transfer between the coils and the fluid. Without going into the details of the rather involved theory of fluid flow and heat transfer in pipes, it is only necessary to consider the fact that the local velocity of the fluid within a conduit is not uniform. The velocity distribution is governed by the Reynolds number which is inversely proportional to viscosity and therefore a function of fluid temperature. For Reynolds numbers below approximately 2100, the motion of the fluid becomes streamline and the local velocity rises from zero at the wall to a maximum at the center along a parabolic distribution curve. For Reynolds numbers greater than approximately 2100, the flow is turbulent and the velocity distribution curve rises more sharply from zero at the wall to a maximum at the center.

It is obvious, therefore, that the heat transfer from the wall to the fluid is affected by the character of the flow in the neighborhood of the wall, i. e. by the temperature of the fluid. As a result of this, the flow meter previously described will show a temperature error which may be considerable when the fluid temperature is greatly varied.

This error may be eliminated by placing a small coil 7 (as shown in Fig. 1) of a wire with a high temperature coefficient of electrical resistance (the resistance of which changes with temperature) i. e. nickel, around the main conduit section 1 and connecting it to one of the ratio arms of the bridge (i. e. arm 5). Thus the ratio arm 5 the resistance of which normally would not vary with temperature is made slightly sensitive to temperature and the Wheatstone bridge is automatically kept in balance for all temperatures within a given range, indicating unbalance only as a result of a change in the rate of flow of the flowing medium. This method of temperature compensation is so effective that in the previously cited instance of aviation gasoline, the temperature error can be held under ±½ of 1% within a temperature range of from 0° C. to 50° C.

The coil 7 may alternately be connected in parallel to shunt the bridge or may be connected in the line between the bridge and the power supply. Furthermore, since the heater coil consists of wire the resistance of which does not vary with temperature, the coil 7 may shunt the heater coil 2 alone, so that as the temperature of the flowing medium rises in the conduit the shunt resistance will increase and a larger share of the wattage will go into the heater coil to rebalance the bridge.

The abovementioned flow meter may be used for controlling the flow of the flowing medium at any desired rate of flow. Such control of the flow is particularly useful in connection with manufacturing installations, e. g. in the chemical industries, for example in the manufacture of synthetic rubber, synthetic gasoline, etc., wherever accurate rates or ratios of flow are required.

In Fig. 1 I have illustrated a flow meter controller wherein an automatic control of the wattage input to the heater is effected by an electronic means.

In this embodiment I have shown the flow meter applied directly to the main conduit P.

The Wheatstone bridge 400 is connected through a series resistance 76 of thermoconstant material to A. C. power lines $L_1$ and $L_2$. The resistor can be used for adjustment and compensating purposes, or it can be omitted if desired. If the voltage of the power supply varies, which is not uncommon when tapping into power mains, there would be excessive fluctuations in the electronic circuit and therefore a ballast tube 77 or a stabilizing transformer of constant voltage output is advantageously inserted between the power supply and the Wheatstone bridge.

On the output diagonal of the bridge is placed the primary of a transformer 8 the output of which supplies in series a voltage and a power amplifier 9 and 10, respectively. Such a voltage amplifier 9 may consist for instance of a number of resistance coupled triodes connected in series or of several amplifier stages used in cascade, the output of one stage being fed to the grid circuit of the next, to provide amplification of the relatively weak signal from the bridge to a voltage sufficiently high to drive the grids of power amplifier 10 which forms the second stage of the electronic amplifier. Any conventional type of electronic power amplifier can be used, a satisfactory example comprising triodes operating in parallel and providing an output current sufficiently large to energize one coil 11 of a 2-phase reversible induction motor 14. The second phase 12 of the motor 14 shown in Fig. 1 is connected to the A. C. power source by means of a capacitor 82 in order to be displaced approximately 90° from the current in the first phase. As is well known, this arrangement of motor 14 has phase discriminating characteristics and the motor will reverse its direction of rotation when the signal from the bridge goes through zero and reverses its phase.

The power amplifier 10 is also designed to act as a phase discriminator, shifting the phase of its output current 180° if the voltage signal from the Wheatstone bridge goes through zero and shifts its phase 180°, which will occur every time the bridge goes through its balance condition from an overbalanced to an underbalanced condition or vice versa. Fig. 3 illustrates the phase discriminating circuit for the power amplifier 10 of Figs. 1 and 2. The output of the voltage amplifier 9 is applied across the condenser 83 and the resistor 84, both of which are connected in series. The plates of the two triodes 85 and 86, respectively, or of sets of triodes connected in parallel, are connected to the secondary winding of a transformer 87, the primary of which is connected to the A. C. power source. The center tap of the secondary winding of the transformer 87 is connected to one leg of the winding 11 of the two phase motor 14, the winding 12 is connected to the A. C. source by means of the condenser 82. The cathodes of the two triodes or sets of triodes 85, 86 respectively, are connected in parallel and through resistor 90 to the other leg of the winding 11. Condenser 91 is connected in parallel to the main pole windings. The circuit thus described has phase discriminating characteristics, so that if the phase of the incoming voltage signal applied across the combination of condenser 83 and resistior 84 shifts 180° the phase of the current through the windings 11 of the motor 14 will simultaneously shift 180°. Since, however, the phase of the current in windings 12 of the motor 14 is fixed in relation to the phase of the A. C. power supply, the end result of a phase shift in coils 11 will be a change in the direction of rotation of the motor 14.

As shown in Fig. 1, the motor 14 is mechanically coupled to a motion transmitting means 100. Gear 15 and rack 16 mechanically couple motor 14 to the rheostat 13 to control the wattage input to the heater coil 2. If the flow rate varies from the desired value the Wheatstone bridge of the flow meter will become unbalanced and a signal produced which is amplified as hereinbefore described and then applied to rotate the motor in one direction or the other. Since the movable contact element of the wattage input controller 13 is mechanically connected to the rack 16 as above indicated, the wattage input of the heater coil is varied as the flow rate varies. Mounted on an extension of the rack portion 16 is a solenoid transmitter coil 17 of a motion transmitting means 100 which is connected to a receiver coil 18 mounted on a rack 19 of a recorder means 200. Thus any motion of the rack 16 due to unbalance of the Wheatstone bridge is transmitted to the recorder means by the inductance bridge coupling between racks 16 and 19.

The coils 17 and 18 are connected to power mains $L_1$ and $L_2$.

The rack 19 is arranged to rotate a gear 20 to which is affixed a recorder arm 21 which has a pen 24 on the end thereof. A movable index pointer arm 22 with an indicator 25 on the end thereof is rotatably mounted on the shaft to which gear 20 is affixed.

As shown in Fig. 1 a second controller Wheatstone bridge 300 is connected to the power supply by means of a ballast tube 177. The ratio of the controller bridge is unit, i. e. resistances 30, 31 of the ratio arm are of equal value. The other arm of the controller bridge consists of two rheostats 28, 29. The pointer arms 21, 22 each carry a contact element 26, 27, respectively, which are the movable elements of rheostats 28, 29 respectively.

On the output diagonal of the controller bridge is placed the primary of a second transformer 32, the secondary or output side of which supplies a voltage amplifier 33 and a power amplifier 34 in series which step up the signal from the A. C. controller bridge sufficiently to operate the valve motor 35 which may also be a 2 phase reversible induction motor which drives gears 38, 39 to regulate valve 40. The motor 35 has a first phase winding 36 which receives the signal from the power amplifier 34, and a second phase winding 37 which is energized from the A. C. power mains, its current being displaced 90° from the current in the first phase by means of a capacitor 182 connected in series therewith.

The operation of the flow meter controller of Fig. 1 is readily apparent from a consideration of the drawings and the discussion presented above. The desired flow rate is set by the operator moving the indicator arm 22 to set the pointer 25 at a predetermined flow rate as read on scale 23, thus positioning the movable contact 27 of rheostat arm 29 in the controller bridge. When the pen 24 coincides in its reading with indicator 25 then the rheostats 28 and 29 are set at equal values and no current flows in the output diagonal of the controller bridge to actuate motor 35. Since the pen 24 indicates the momentary flow rate values, being made motion responsive to unbalance in the signal bridge 400, any unbalance in the signal bridge will cause a corresponding unbalance in the controller bridge to actuate motor 35 in the appropriate direction to open or close valve 40 to readjust the flow rate so that pen 24 coincides with indicator 25.

Alternative to the second controller bridge arrangement of Fig. 1 for operating a valve 40 in flow conduit 1 the pneumatic controller means shown in Fig. 2 can be used. The identical signal bridge arrangement with flow meter together with the motion transmitter means 15, 16, 17, 18, etc. as shown in Fig. 1 is used in connection with the pneumatic controller means shown in Fig. 2. Such a pneumatic means is preferably a unit such as the "Air-O-Line Controller" made by the Brown Instrument Co. This unit is indicated by reference numeral 125 and as is well known includes a non-bleed pilot valve 126 having a double bellows assembly actuating a flapper over inlet and exhaust ports and a flapper valve unit 127 containing a fixed nozzle. The particular details of this pneumatic controller unit are not per se the subject of the invention herein but are important only insofar as they affect the operation of the combination. It is sufficient to relate however that the recorder means 200 used in connection with the pneumatic controller has a recorder pen arm 121 and a control index pointer 122 which are connected by means of a differential linkage 128. The linkage 128 also includes a setting knob affixed to the index pointer 122 and is so designed that a movement of the pen 121 with respect to the control index 122 will operate the flapper valve unit 127 whereas when the pen and the control index are superimposed, the flapper valve unit remains in a fixed position, regardless of the setting of the control index.

In operation the desired flow rate is set by the operator moving the setting knob to position the index pointer 122 at the desired flow rate value. If, for example, the flow rate as indicated by the recorder pen 122 rises above the index control setting the unit 125 through the differential linkage and adjustable leverage 128 will operate the flapper valve unit 127 to restrict air flow therethrough by allowing a flapper element to partially cover the above-mentioned fixed nozzle. A back pressure is thus built up and transmitted by a piping means 128 to the non-bleed pilot valve 126 which amplifies the pressure to build up the pressure on the diaphragm control valve 140 thereby slightly closing the valve to reduce the flow rate to the value desired as set by the index pointer 122.

Calibrations of the recorder means 200 is accomplished by varying the flow rate in consecutive steps, e. g. 50 pounds per hour, and measuring it either by the discharge method or the calibrated flow meter standard, etc. After steady state condition is reached for each calibration step the position of the pen is noted and marked with the measured rate of flow.

It is seen, therefore, that I have provided a highly efficient flow meter and flow control apparatus for regulating the flow rate of a flowing medium in a confined conduit operable on D. C. or A. C. current, without any interference with the free flow of the flowing medium. Although I have described above specific illustrations of my invention it should be understood, of course, that my invention is not to be limited to these illustrations and is to be limited only by the scope of the claims hereinafter following.

What I claim and desire to protect by Letters Patent is:

1. A fluid flow responsive system comprising flow sensing means including a first and a second temperature responsive electrical resistance means externally wound on a tubing section, a temperature compensating electrical resistance means externally wound on the tubing section, said first temperature responsive means and the temperature compensating means being responsive to the temperature of a flowing medium prior to the transmission of heat thereto, said second temperature responsive means being responsive to the temperature of a flowing medium after the transmission of heat thereto; a bridge network consisting of a pair of fixed resistances connected in series across a source of potential, the aforesaid temperature responsive resistances constituting the thermometer arms of the bridge network, and the temperature compensating resistance being in series with one of the said fixed resistances; electronic unbalance detector means connected across the diagonal of the bridge defined by a point between the two temperature responsive means and a point between the fixed resistances and responsive to departures of the flow from a predetermined flow rate; and operating means adapted to receive a signal from said electronic unbalance detector means responsive to sensed departures in flow rate and operative to restore the flow to said predetermined rate.

2. A fluid flow responsive system comprising flow sensing means including a first and a second temperature responsive electrical resistance means, said first temperature responsive means being responsive to the temperature of a flowing medium prior to the transmission of heat thereto, said second temperature responsive means being responsive to the temperature of a flowing medium after the transmission of heat thereto, a bridge network including a pair of fixed resistances connected in series across a source of potential and regulating means connected in series with a heat transmitting means and serving to vary the energy input thereto, the temperature responsive resistances constituting the thermometer arms of the bridge network, electronic unbalance detector means connected across the diagonal of the bridge defined by a point between the two temperature responsive means and a point between the fixed resistances and responsive to departures of the flow from a predetermined flow rate, said unbalance detector means comprising an electronic controller means including a reversible electric motor interconnected to vary the energy output of said regulating means, said controller means being responsive to any unbalance of the said bridge whereby said motor operates in connection with said regulating means to vary the energy input into said heater to maintain the balance of the bridge, operating means adapted to receive a signal from said electronic unbalance detector means responsive to sensed departures in flow rate and operative to restore the flow to said predetermined rate, energy consumption indicating means connected in series with said heat transmitting means to record the amount of energy required to maintain the bridge balance, said operating means including a motion transmitter means interconnecting said motor with a recorder means, a second bridge network and a second electronic controller including a second reversible electric motor.

3. A fluid flow responsive system comprising flow sensing means including a first and a second temperature responsive electrical resistance means, said first temperature responsive means being responsive to the temperature of a flowing medium prior to the transmission of heat thereto, said second temperature responsive means being responsive to the temperature of a flowing medium after the transmission of heat thereto, a bridge network including a pair of fixed resistances connected in series across a source of potential and regulating means connected in series with a heat transmitting means and serving to vary the energy input thereto, the temperature responsive resistances constituting the thermometer arms of the bridge network, electronic unbalance detector means connected across the diagonal of the bridge defined by a point between the two temperature responsive means and a point between the fixed resistances and responsive to departures of the flow from a predetermined flow rate, said unbalance detector means comprising an electronic controller means including a reversible electric motor interconnected to vary the energy output of said regulating means, said controller means being responsive to any unbalance of the said bridge whereby said motor operates in connection with said regulating means to vary the energy input into said heater to maintain the balance of the bridge, operating means adapted to receive a signal from said electronic unbalance detector means responsive to sensed departures in flow rate and operative to restore the flow to said predetermined rate, energy consumption indicating means connected in series with said heat transmitting means to record the amount of energy required to maintain the bridge balance, said operating means including a motion transmitter means interconnecting said motor with a recorder means, and a pneumatic controller means mechanically interconnected with said recorder means.

4. The apparatus of claim 3 wherein the pneumatic controller consists of a pilot valve and a flapper valve unit, the recorder being mechanically linked to the flapper valve unit by a differential linkage and operable thereby in response to sensed departures from the predetermined flow rate.

5. The apparatus of claim 2 wherein the unbalance signal from said first bridge network is fed to a transformer means, the output thereof in turn energizing an amplifier means, said first reversible electric motor means having one winding which is energized by a signal from said amplifier, and another winding energized by an alternating current source phase displaced from the current in said first winding.

6. The apparatus of claim 5 wherein said motion transmitter means includes a pair of movable core members having induction coils associated therewith, said first reversible electric motor being operable to actuate one core member, the other of said core members being operable to actuate the recorder means, said second bridge network being adapted to receive a signal from said recorder means.

References Cited in the file of this patent

UNITED STATES PATENTS

| 1,222,492 | Thomas | Apr. 10, 1917 |
| 1,254,871 | Wilson | Jan. 29, 1918 |
| 1,254,374 | Thomas | Jan. 22, 1918 |
| 1,601,513 | Stoekle et al. | Sept. 28, 1926 |
| 2,067,645 | Pinkerton | Jan. 12, 1937 |
| 2,317,807 | Ryder | Apr. 27, 1943 |
| 2,389,615 | Eder | Nov. 27, 1945 |
| 2,446,283 | Hulsberg | Aug. 3, 1948 |
| 2,525,197 | Beams et al. | Oct. 10, 1950 |
| 2,548,939 | Brion | Apr. 17, 1951 |
| 2,636,151 | Hornfeck | Apr. 21, 1953 |
| 2,689,932 | Hornfeck | Sept. 21, 1954 |

FOREIGN PATENTS

| 799,747 | France | Apr. 11, 1936 |
| 104,663 | Sweden | June 2, 1942 |

UNITED STATES PATENT OFFICE

CERTIFICATE OF CORRECTION

Patent No. 2,832,018                                            April 22, 1958

John H. Laub

It is hereby certified that error appears in the above numbered patent requiring correction and that the said Letters Patent should read as corrected below.

In the drawings, Sheet 1, Fig. 1, the electrical connection between lines $L_1$, $L_2$, Fig. 1, where they are shown connected to coils 17, 18 should be removed.

Signed and sealed this 21st day of April 1959.

(SEAL)

Attest:

KARL H. AXLINE                                               ROBERT C. WATSON

Attesting Officer                                       Commissioner of Patents